P. SCHROEDER.
LOCK NUT.
APPLICATION FILED APR. 4, 1913.
1,076,396.  Patented Oct. 21, 1913.
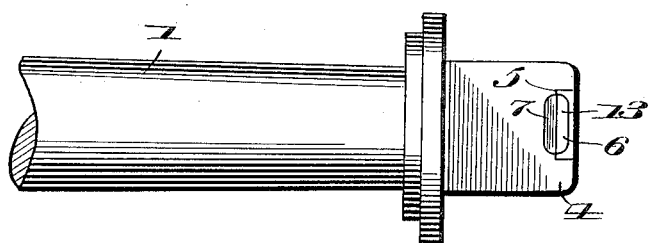
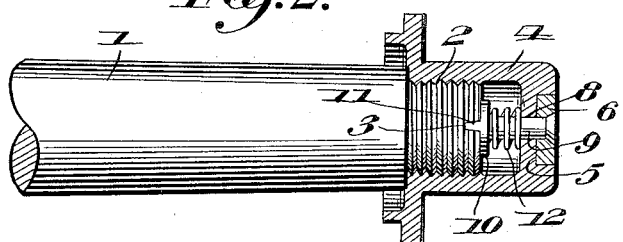
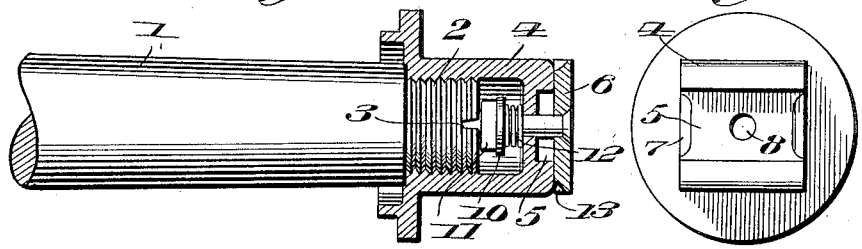 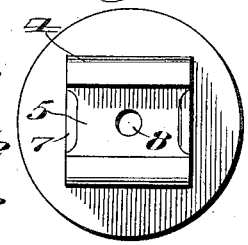
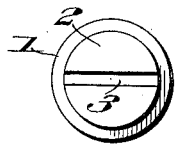 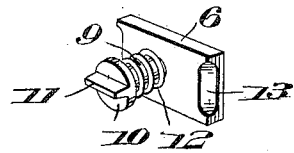
Inventor
Peter Schroeder
By Victor J. Evans
Attorney
Witnesses

UNITED STATES PATENT OFFICE.

PETER SCHROEDER, OF MISHICOT, WISCONSIN.

LOCK-NUT.

1,076,396.  Specification of Letters Patent.  Patented Oct. 21, 1913.

Application filed April 4, 1913. Serial No. 758,887.

*To all whom it may concern:*

Be it known that I, PETER SCHROEDER, a citizen of the United States, residing at Mishicot, in the county of Manitowoc and State of Wisconsin, have invented new and useful Improvements in Lock-Nuts, of which the following is a specification.

The present invention relates to simple but effective means for sustaining a carriage nut in locked position upon the threaded end of an axle, and resides in the construction, combination and operative arrangement of parts set forth in the following specification and falling within the scope of the appended claim.

In the drawing: Figure 1 is a view illustrating the improvement in applied position, Fig. 2 is a central longitudinal sectional view of the same, Fig. 3 is a view illustrating the arrangement of the locking device upon the nut when the nut is to be removed, Fig. 4 is an end view of the axle, Fig. 5 is an end view of the nut, the locking element being removed, and Fig. 6 is a perspective view of the locking element and its spring.

While in the accompanying specification, the device will be described in connection with a vehicle axle and a nut therefor, and such a structure will be illustrated in the drawings, it is to be understood that the improvement is not to be thus limited in its useful application, as the locking device may be employed upon nuts which coöperate with bolts.

Referring now to the drawing in detail, the numeral 1 designates a portion of an axle spindle, 2 the threaded extremity of the spindle, and 3 a transverse slot or depression arranged in the end of the threaded portion 2.

4 designates the nut. The nut is in the form of the usual carriage nut, having its threaded bore terminating a suitable distance away from its outer face. The outer face of the nut is formed with a transverse depression 5 which forms a pocket for the head 6 of the locking element. Two of the opposite sides of the nut are scalloped toward the end walls provided by the pocket, as indicated by the numerals 7. The inner wall of the pocket 5 is centrally formed with a circular opening 8 which communicates with the bore of the nut, and the said opening is adapted for the reception of a stem 9 which is connected with the head 6. The stem has its free end formed with an annular flange 10, and the said flange is provided with a reduced centrally arranged projecting finger 11, the said finger being adapted to engage with the slot 3 of the axle spindle when the nut is locked upon the spindle. Arranged between the inner face of the flange 10 and the inner wall of the bore of the nut is a helical spring 12 which exerts a tension against the said flange and which is adapted to force its finger 11 into engagement with the slot 3 when the nut is screwed home upon the threaded portion 2 of the spindle, but which at the same time permits of an outward movement of the locking element so that the said element will ride upon the end of the portion 2 until the nut is rotated to bring its finger into proper register with the slot 3. The head 6 of the locking device is adapted to fully fill the pocket 5, and the opposite ends of the said substantially rectangular head are undercut or flared inwardly, as at 13, the said portions 13 being normally arranged adjacent the flared or angular portion 7 so that the fingers of an operator may be readily inserted within the depressions thus provided to permit of the head being pulled outwardly of the nut and rotated upon the nut, to cause its underface to be arranged upon the walls of the outer face of the nut opposite its pocket 5, which will, of course, hold the finger 11 from its engagement with the slot 3 and permit of the unscrewing of the nut from the spindle.

From the above description, taken in connection with the accompanying drawing, the simplicity of the device as well as the advantages thereof, will, it is thought, be perfectly apparent to those skilled in the art to which such inventions appertain without further detailed description.

What is claimed is:

A threaded member having its end provided with a tranverse slot, a nut having a closed end depressed to provide a rectangular pocket which communicates with the opposite sides of the nut, the edges of the nut at said opposite sides being beveled toward the pocket, a locking element, said element including a head which is adapted to snugly fit within the pocket and having its transverse edges flared inwardly, the pocket being centrally provided with a circular opening which enters the bore of the nut, the head of the locking element having a stem which passes through the opening, the said stem being provided with a flange which is arranged within the bore of the nut, a finger arranged upon the flange and adapted to engage with the slot of the threaded element, a spring surrounding the flange and the inner wall of the bore of the nut, and the stem of the locking element being of sufficient length to permit of the withdrawal of the head of the locking element from the pocket of the nut to allow the head to be rotated and engaged by the outer face of the nut transverse of the pocket provided upon the said outer face.

In testimony whereof I affix my signature in presence of two witnesses.

PETER SCHROEDER.

Witnesses:
AUG. STUECK,
WM. STONEMAN.

Copies of this patent may be obtained for five cents each, by addressing the "Commissioner of Patents, Washington, D. C."